US009277564B2

(12) United States Patent
Wang et al.

(10) Patent No.: US 9,277,564 B2
(45) Date of Patent: Mar. 1, 2016

(54) METHOD AND APPARATUS TO FACILITATE SUPPORT FOR MULTI-RADIO COEXISTENCE

(75) Inventors: Jibing Wang, San Diego, CA (US); Tamer Adel Kadous, San Diego, CA (US); Ashok Mantravadi, San Diego, CA (US); Joel Benjamin Linsky, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 603 days.

(21) Appl. No.: 13/198,471

(22) Filed: Aug. 4, 2011

(65) Prior Publication Data

US 2012/0163307 A1 Jun. 28, 2012

Related U.S. Application Data

(60) Provisional application No. 61/371,034, filed on Aug. 5, 2010, provisional application No. 61/469,784, filed on Mar. 30, 2011.

(51) Int. Cl.
*H04W 4/00* (2009.01)
*H04W 72/12* (2009.01)
*H04W 88/08* (2009.01)
(Continued)

(52) U.S. Cl.
CPC .......... *H04W 72/1215* (2013.01); *H04W 72/04* (2013.01); *H04W 88/08* (2013.01); *H04W 72/02* (2013.01); *H04W 72/0446* (2013.01); *H04W 72/0453* (2013.01); *H04W 88/06* (2013.01)

(58) Field of Classification Search
CPC ............ H04W 72/04; H04W 72/0446; H04W 72/0453; H04W 88/08; H04W 76/00; H04W 72/02; H04W 88/06
See application file for complete search history.

(56) References Cited

U.S. PATENT DOCUMENTS 7,725,118 B2  5/2010 Yang et al.
7,778,226 B2  8/2010 Rayzman et al.
(Continued)

FOREIGN PATENT DOCUMENTS

GB  2412817 A  10/2005

OTHER PUBLICATIONS

Yang et al., "Bluetooth Coexistence with 4G Broadband Wireless Networks," 2010 7th Annual IEEE Communications Society Conference on Sensor, Mesh and Ad Hoc Communications and Networks (SECON),pp. 3-6, (Jun. 2010).

(Continued)

*Primary Examiner* — Lonnie Sweet
(74) *Attorney, Agent, or Firm* — Seyfarth Shaw LLP

(57) ABSTRACT

A method of wireless communication includes monitoring coexistence issues among supported radios in a User Equipment (UE). The method includes determining a coexistence policy for communication resource operation within a user equipment (UE) and configuring communication resources of the user equipment in accordance with the determined coexistence policy. The policy may give priority to an LTE modem, an ISM modem, or may implement a variable priority scheme. The policy may be communicated to each modem from a host over a software messaging communication line. Modems in the UE may communicate with each other through logical lines providing real time communication. The policy may determine the operation of each modem and the treatment of the logical lines by each modem.

17 Claims, 9 Drawing Sheets

(51) Int. Cl.
*H04W 72/04* (2009.01)
*H04W 72/02* (2009.01)
*H04W 88/06* (2009.01)

(56) References Cited

U.S. PATENT DOCUMENTS

| | | | |
|---|---|---|---|
| 7,929,912 B2 | 4/2011 | Sherman | |
| 7,941,178 B2 | 5/2011 | Guo et al. | |
| 7,965,676 B2 | 6/2011 | Dimou et al. | |
| 8,385,288 B2 | 2/2013 | Sridhara et al. | |
| 8,514,798 B2 | 8/2013 | Lee et al. | |
| 8,537,799 B2 | 9/2013 | Tsfati et al. | |
| 8,885,561 B2 | 11/2014 | Wang et al. | |
| 2008/0182577 A1 | 7/2008 | Ng et al. | |
| 2009/0054009 A1 | 2/2009 | Yang et al. | |
| 2009/0081962 A1 | 3/2009 | Sohrabi | |
| 2009/0129367 A1* | 5/2009 | Bitran | 370/350 |
| 2009/0163145 A1 | 6/2009 | Xhafa et al. | |
| 2009/0196210 A1 | 8/2009 | Desai | |
| 2009/0225717 A1 | 9/2009 | Banerjea | |
| 2009/0257379 A1* | 10/2009 | Robinson et al. | 370/329 |
| 2010/0029325 A1 | 2/2010 | Wang et al. | |
| 2010/0039936 A1 | 2/2010 | Jin et al. | |
| 2010/0111047 A1 | 5/2010 | Yang et al. | |
| 2010/0142500 A1 | 6/2010 | Sudak | |
| 2010/0203832 A1* | 8/2010 | Russell et al. | 455/41.2 |
| 2010/0322287 A1* | 12/2010 | Truong et al. | 375/133 |
| 2011/0151874 A1 | 6/2011 | Olsson et al. | |
| 2012/0093009 A1 | 4/2012 | Wang et al. | |
| 2013/0223391 A1* | 8/2013 | Koo et al. | 370/329 |

OTHER PUBLICATIONS

International Search Report and Written Opinion—PCT/US2011/046827—ISA/EPO—Nov. 3, 2011(101370W0).

Mediatek: "Discussion on In-device Coexistence Interference Avoidance", 3GPP Draft; R2-103644_Disc on Multi-Radio Coexistence_ys, 3rd Generation Partnership Project (3GPP), Mobile Competence Centre ; 650, Route Des Lucioles ; F-06921 Sophia-Antipolis Cedex ; France, - - vol. RAN WG2, No. Stockholm, Sweden; 20100628, Jun. 22, 2010, XP050451165, [retrieved on Jun. 22, 2010].

3rd Generation Partnership Project; Technical Specification Group Radio Access Networks; Evolved Universal Terrestrial Radio Access (E-UTRA) ; Study on signaling and procedure for interference avoidance for in-device coexistence; (Release 10), 3GPP Standard; 3GPP TR 36.816, 3RD Generation Partnership Project (3GPP), Mobile Competence Centre ; 650, Route Des Lucioles ; F-06921 Sophia-Antipolis Cedex ; France, No. v1.0.0, Dec. 17, 2010, pp. 1-34, XP050462125, [retrieved on Dec. 17, 2010].

Motorola: "Discussion on TDM approach for In-device coexistence", 3GPP Draft; R2-106476, 3RD Generation Partnership Project (3GPP), Mobile Competence Centre ; 650, Route Des Lucioles ; F-06921 Sophia-Antipolis Cedex ; France, vol. RAN WG2, No. Jacksonville, USA; 20101115, Nov. 9, 2010, XP050492293, [retrieved on Nov. 9, 2010].

\* cited by examiner

METHOD AND APPARATUS TO FACILITATE SUPPORT FOR MULTI-RADIO COEXISTENCE

CROSS REFERENCE TO RELATED APPLICATIONS

This application claims the benefit of U.S. provisional patent application No. 61/371,034 filed Aug. 5, 2010, in the names of WANG et al., and U.S. provisional patent application No. 61/469,784, filed Mar. 30, 2011, in the names of WANG et al., the disclosures of which are expressly incorporated herein by reference in their entireties.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

BRIEF SUMMARY

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

According to an aspect of the present disclosure, a method for wireless communications includes receiving over a software messaging input, a coexistence policy for operation of communication resources of a first radio access technology within a user equipment (UE). The method also includes configuring operation of communication resources of the user equipment in response to signals on logical lines between resources of the first radio access technology and resources of a second radio access technology based on the coexistence policy.

In another aspect, an apparatus for wireless communication has a memory, and at least one processor coupled to the memory. The processor(s) is configured to receive over a software messaging input, a coexistence policy for operation of communication resources of a first radio access technology within a user equipment (UE). The processor(s) is also configured to configure operation of communication resources of the user equipment in response to signals on logical lines between resources of the first radio access technology and resources of a second radio access technology based on the coexistence policy.

In yet another aspect, a computer program product for wireless communication in a wireless network includes a non-transitory computer-readable medium having non-transitory program code recorded thereon. The program code includes program code to receive over a software messaging input, a coexistence policy for operation of communication resources of a first radio access technology within a user equipment (UE). The program code also includes program code to configure operation of communication resources of the user equipment in response to signals on logical lines between resources of the first radio access technology and resources of a second radio access technology based on the coexistence policy.

In still another aspect, an apparatus for wireless communications includes means for receiving over a software messaging input, a coexistence policy for operation of communication resources of a first radio access technology within a user equipment (UE). The apparatus also has means for configuring operation of communication resources of the user equipment in response to signals on logical lines between resources of the first radio access technology and resources of a second radio access technology based on the coexistence policy.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
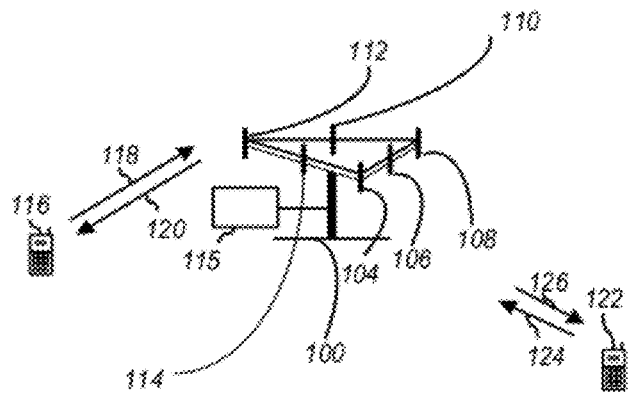
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3$^{rd}$ Generation Partnership Project" (3GPP). cdma2000 is described in documents from an organization named "3$^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over an uplink (UL) 188. The UE 122 is in communication with antennas 106 and 108, while antennas 106 and 108 transmit information to the UE 122 over a downlink (DL) 126 and receive information from the UE 122 over an uplink 124. In an FDD system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
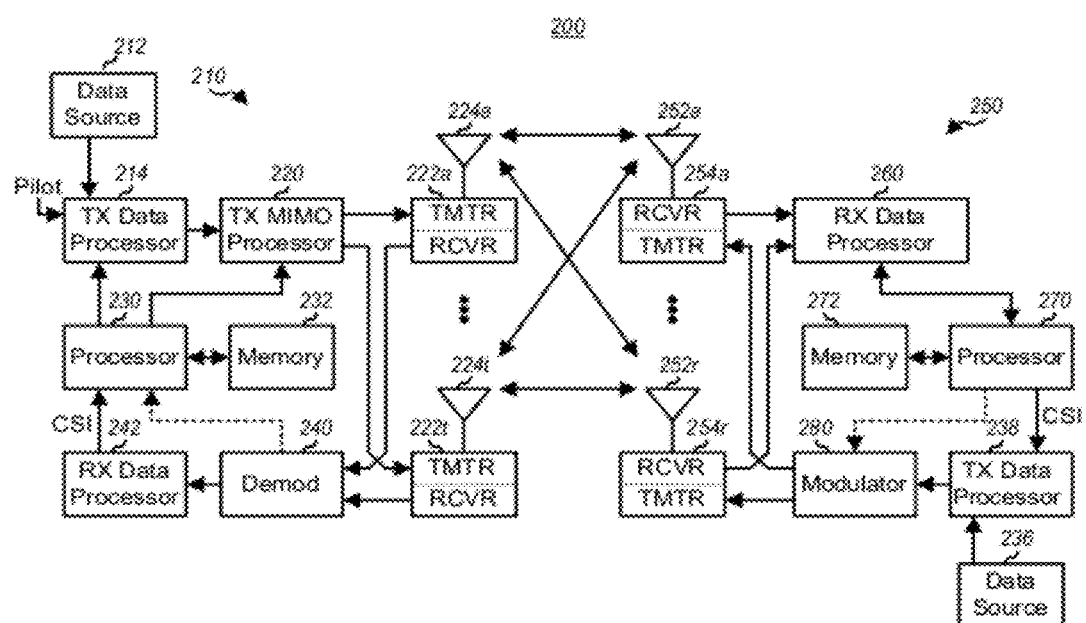
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
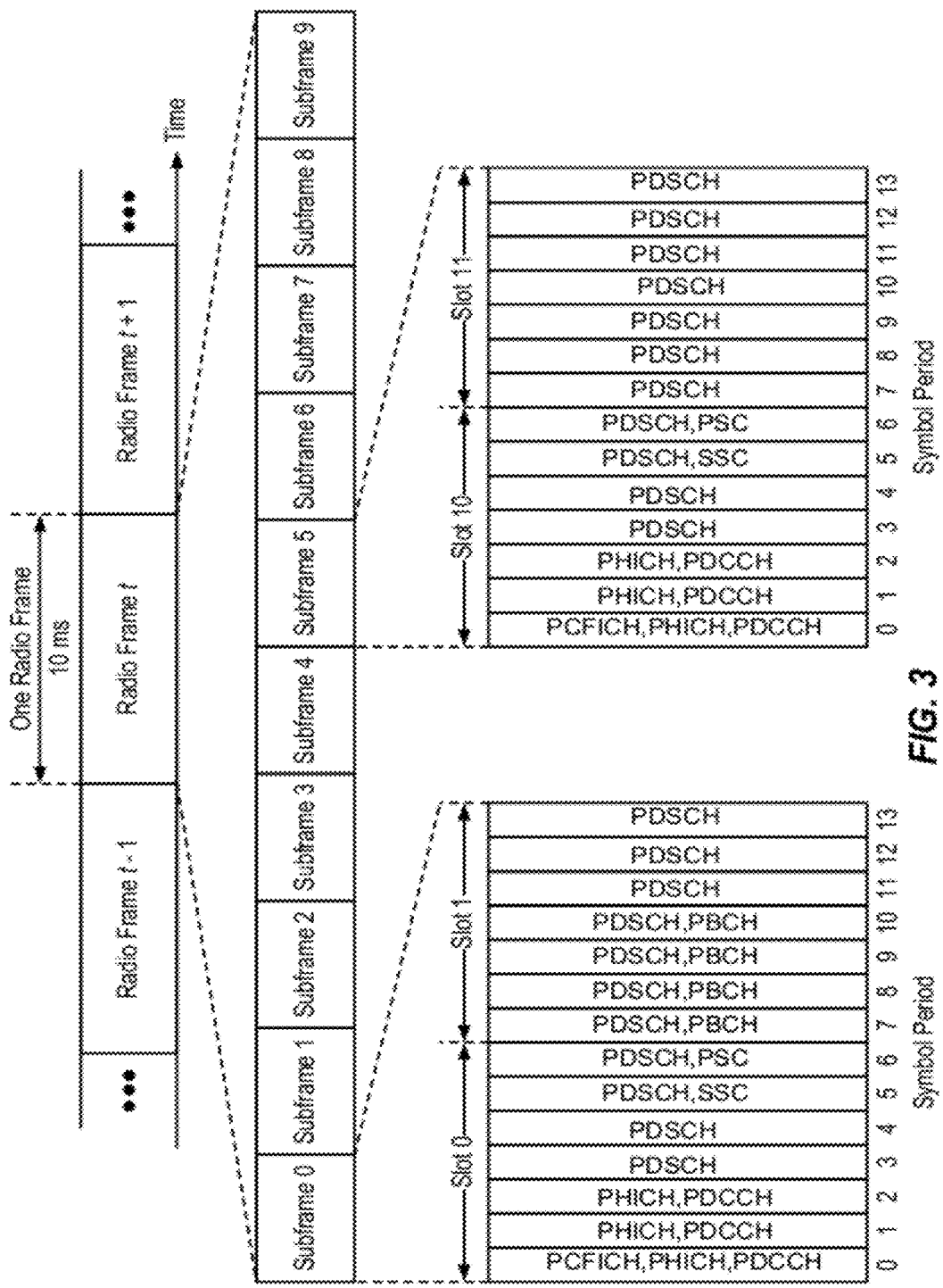
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
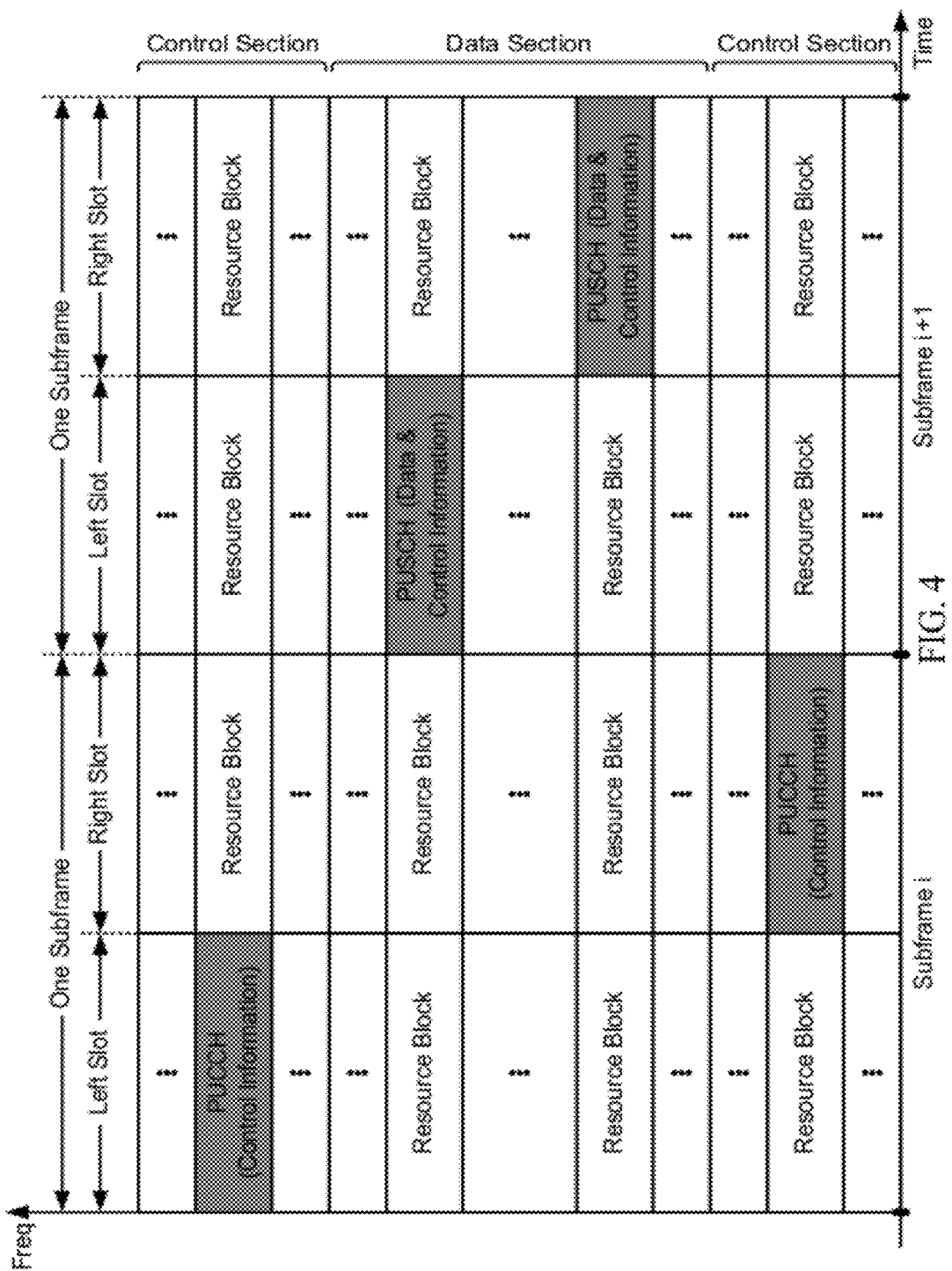
FIG. 4 is a block diagram conceptually illustrating an exemplary frame structure in uplink Long Term Evolution (LTE) communications.

FIG. 4 is a block diagram conceptually illustrating an exemplary frame structure in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
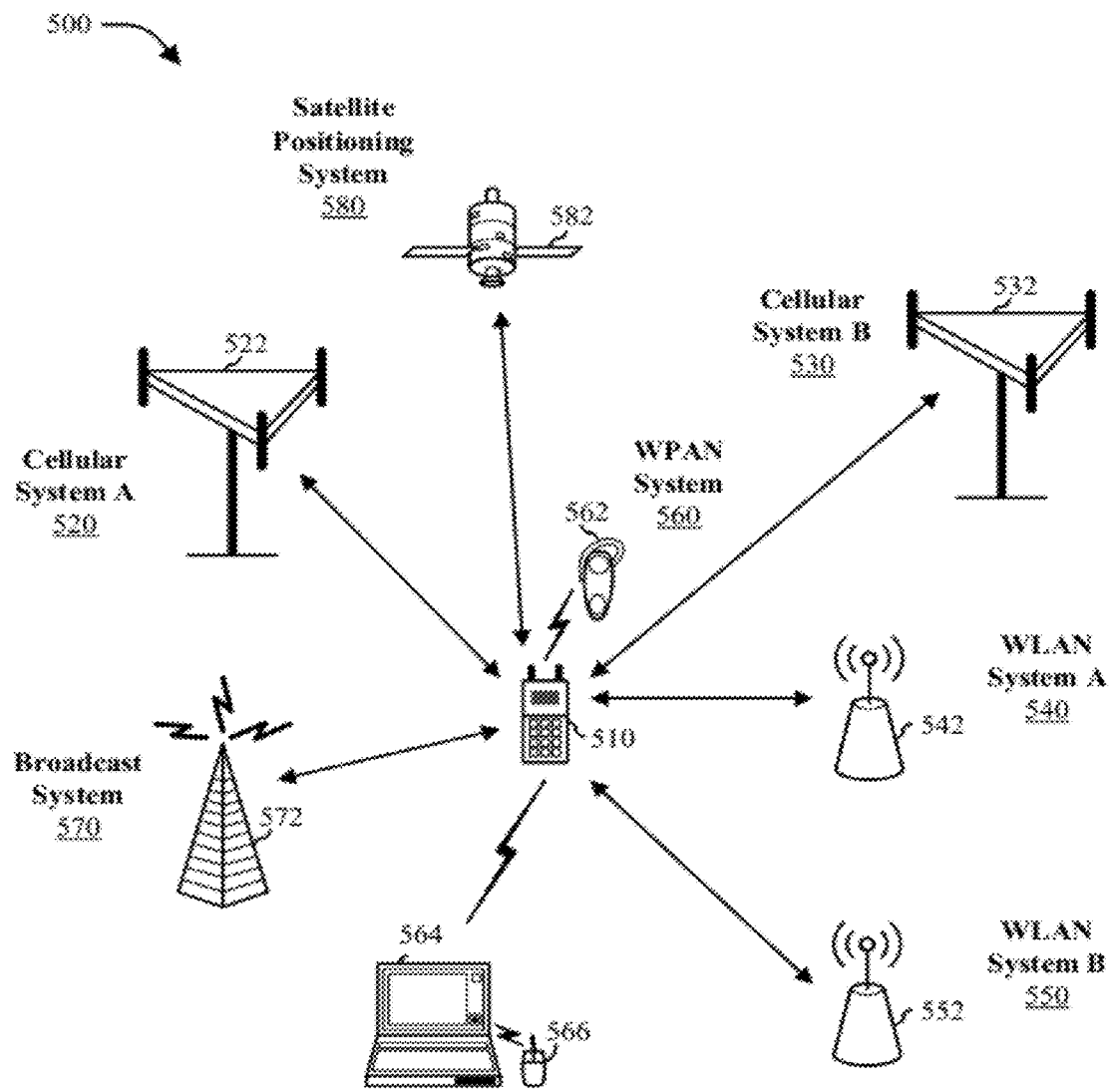
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices(s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
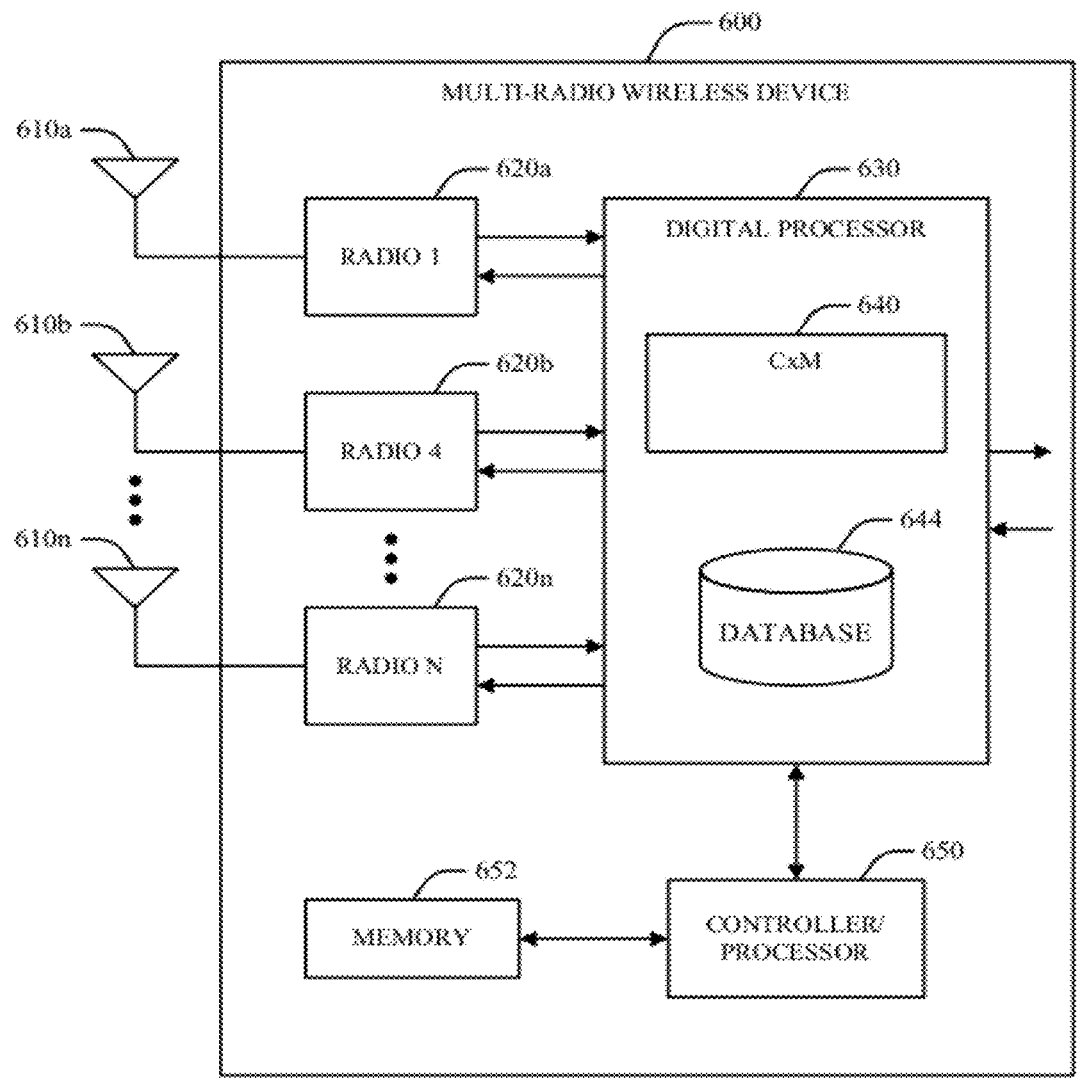
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
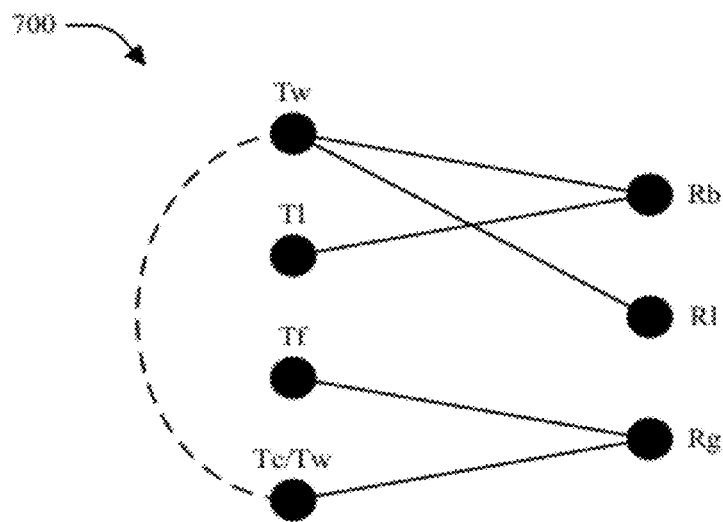
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as those illustrated in FIGS. 11, 13, and 14. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
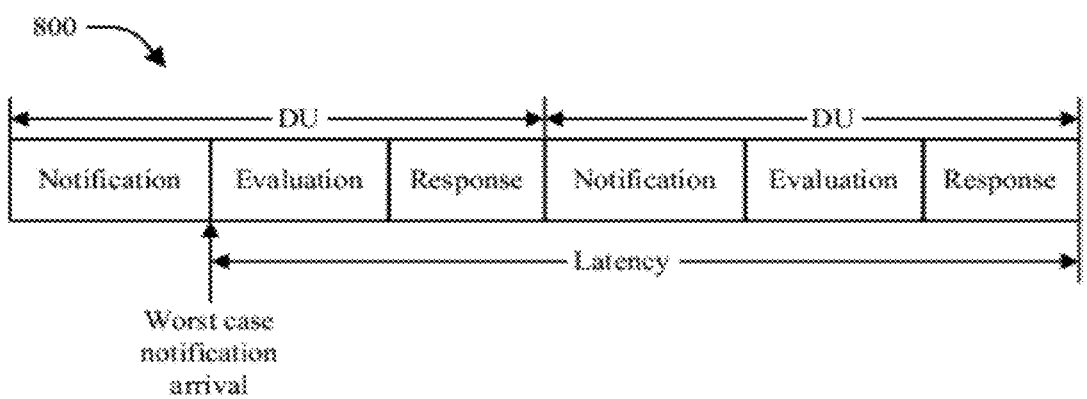
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 μs) where notifications are processed, and a response phase (e.g., 20 μs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

In-device coexistence problems can exist with respect to a UE between resources such as, for example, LTE and ISM bands (e.g., for Bluetooth/WLAN). In current LTE implementations, any interference issues to LTE are reflected in the DL measurements (e.g., Reference Signal Received Quality (RSRQ) metrics, etc.) reported by a UE and/or the DL error rate which the eNB can use to make inter-frequency or inter-RAT handoff decisions to, e.g., move LTE to a channel or RAT with no coexistence issues. However, it can be appreciated that these existing techniques will not work if, for example, the LTE UL is causing interference to Bluetooth/WLAN but the LTE DL does not see any interference from Bluetooth/WLAN. More particularly, even if the UE autonomously moves itself to another channel on the UL, the eNB can in some cases handover the UE back to the problematic channel for load balancing purposes. In any case, it can be appreciated that existing techniques do not facilitate use of the bandwidth of the problematic channel in the most efficient way.

Figure 9:
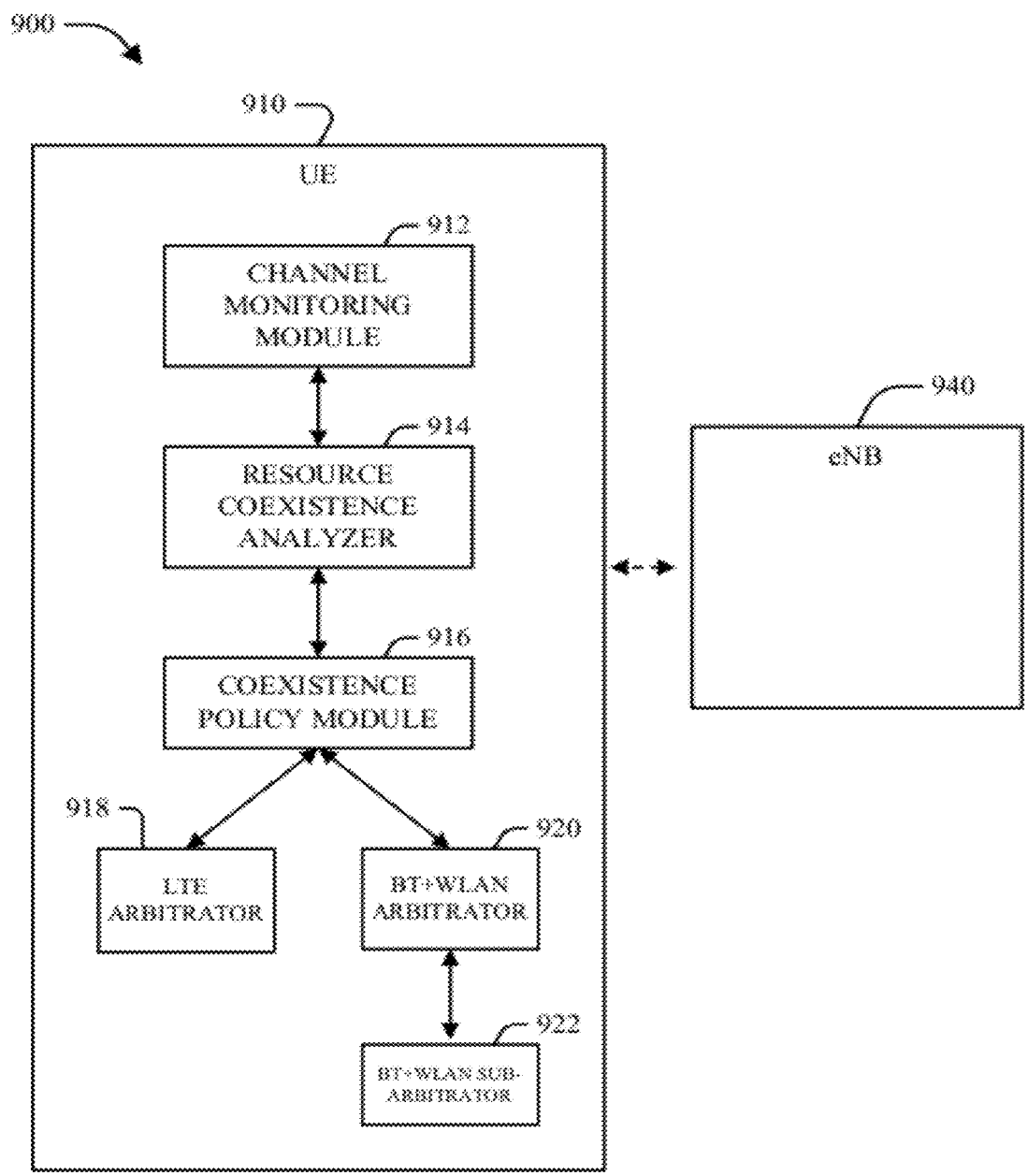
FIG. 9 is a block diagram of a system for providing support within a wireless communication environment for multi-radio coexistence management according to one aspect of the present disclosure.

Turning now to FIG. 9, a block diagram of a system 900 for providing support within a wireless communication environment for multi-radio coexistence management is illustrated. In an aspect, the system 900 can include one or more UEs 910 and/or eNBs 940, which can engage in UL, DL, and/or any other suitable communication with each other and/or any other entities in the system 900. In one example, the UE 910 and/or eNB 940 can be operable to communicate using a variety resources, including frequency channels and subbands, some of which can potentially be colliding with other radio resources (e.g., a Bluetooth radio). Thus, the UE 910 can utilize various techniques for managing coexistence between multiple radios utilized by the UE 910, as generally described herein.

To mitigate at least the above shortcomings, the UE 910 can utilize respective features described herein and illustrated by the system 900 to facilitate support for multi-radio coexistence within the UE 910. In particular, a channel monitoring module 912, resource coexistence analyzer 914, coexistence policy module 916, LTE arbitrator 918, BT+WLAN arbitrator 920, and BT+WLAN sub-arbitrator 922 may be implemented. The channel monitoring module 912 monitors the performance of communication channels for potential interference issues. The resource coexistence analyzer 914 may determine what channel conditions may be impacted by various coexistence policies. The coexistence policy module 916 may determine policies governing radio behavior to reduce interference between radios as discussed in detail below. The LTE arbitrator 918 may implement coexistence policies with an LTE radio as discussed in detail below. The BT+WLAN arbitrator 920 may implement coexistence policies with ISM radios such as Bluetooth (BT) and WLAN as described in detail below. The BT+WLAN sub-arbitrator 922 may arbitrate between ISM radio access technologies to determine how those radio access technologies may share particular ISM components as discussed in detail below. The various modules 912-922 may, in some examples, be implemented as part of a coexistence manager such as the CxM 640 of FIG. 6. The various modules 912-922 and others may be configured to implement the aspects discussed herein.

Figure 10:
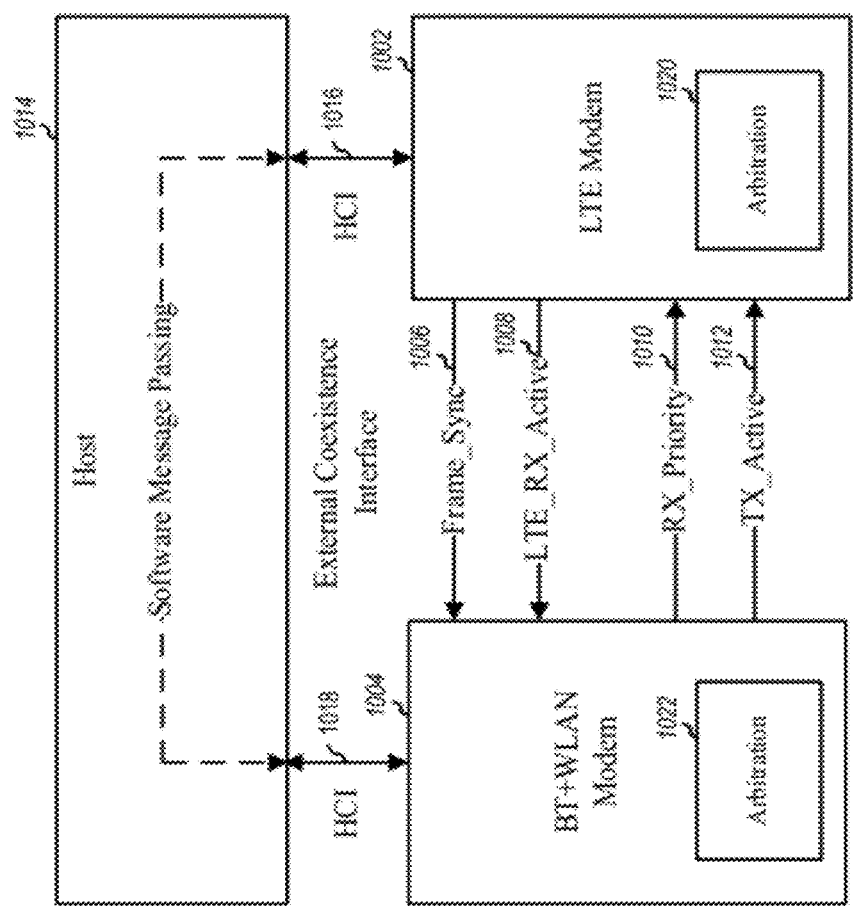
FIG. 10 is a diagram showing an example communication resource configuration according to one aspect of the present disclosure.

A particular hardware configuration may be adopted to address coexistence issues between LTE and ISM band communications. An example of such a hardware configuration is shown in FIG. 10. The hardware configuration shown in FIG. 10 may improve system performance and alleviate coexistence problems. As shown in FIG. 10, logical lines may be established to connect an ISM modem 1004 (such as a Bluetooth+WLAN modem) and an LTE modem 1002. These logical lines may be physical lines, or may be expressed in different hardware configurations. One or more logical lines may connect the modems and may be used for various purposes, or may be used by the modems to carry different signals at different times. In the example of FIG. 10, four logical lines are shown, but a different number may be used. Also, in the example of FIG. 10, the logical lines are depicted as hardware lines, but other configurations are possible. Four logical lines 1006, 1008, 1010, and 1012 are shown in FIG. 10. Frame_Sync signal 1006, LTE_RX_Active signal 1008, RX_Priority signal 1010, and TX_Active signal 1012.

Frame_Sync 1006 and LTE_RX_Active 1008 carry signals from the LTE modem 1002 to the Bluetooth+WLAN modem 1004 while RX_Priority 1010 and TX_Active 1012 carry signals from the Bluetooth+WLAN 1004 modem to the LTE modem 1002.

In the example shown in FIG. 10, the logical lines are used as follows: Frame_Sync 1006 is used by the LTE modem 1002 to tell the ISM modem 1004 where the LTE modem 1002 is in its frame structure. A line such as Frame_Sync 1006 may be used by time division technologies (such as TDD-LTE) to coordinate frame timing with the modem of another technology (such as Bluetooth). Using Frame_Sync 1006, the ISM modem 1004 can know when the LTE modem 1002 is scheduled to transmit, receive, etc. based on the frame timing. LTE_RX_Active 1008 allows the LTE modem 1002 to tell the ISM modem 1004 that the LTE modem 1002 is going to be receiving. Based on how a policy configuration is set, this signal may then prompt the ISM modem 1004 not to transmit to avoid interference to the LTE modem 1002. Various policy configurations are discussed below. RX_Priority 1010 allows the ISM modem 1004, in particular the Bluetooth technology, to indicate to the LTE modem 1002 that the ISM modem 1004 is receiving a priority Bluetooth signal. The policy configuration will determine when RX_Priority 1010 is set by the ISM modem 1004 and the corresponding response by the LTE modem 1002 (i.e., holding transmission, ignoring, etc.). TX_Active 1012 indicates transmit activity.

One benefit of the logical lines is that they provide real time, possibly physical layer communications between the modems that may be transmitted in the scale of microseconds, allowing for fast communications between the modems to manage potential coexistence issues. While four logical lines are shown in FIG. 10, other logical lines, which may be used for other purposes, are possible.

Another communication path between the modems may also exist. As shown in FIG. 10, a host 1014 is capable of communicating with both the Bluetooth+WLAN modem 1004 and the LTE modem 1002. Each modem has a host controller interface (HCI) 1016, 1018 for communicating with the host 1014. The host 1014 is capable of passing messages between the Bluetooth+WLAN modem 1004 and the LTE modem 1002. Host communications to the modems may operate on a slower timescale than the logical lines between the modems. The software messaging path of the host 1014 may operate on the order of tens of milliseconds. Software message passing may be used for a variety of other reasons as well, including identifying to one radio the frequency being used by the other. If the frequencies are far away from each other, there may be a reduced chance for interference and the host may adopt a policy of free operation by the modems (or identify that only one direction of transmission has coexistence issues, allowing adoption of a policy accordingly.)

Each modem also features a real-time arbitrator, one arbitrator 1022 on the Bluetooth+WLAN side and one arbitrator 1020 on the LTE side. The arbitrators determine transmission and receiving behavior by each side respectively. The Bluetooth+WLAN modem 1004 may also include a sub-arbitrator 922 (FIG. 9) to arbitrate between Bluetooth and WLAN. The winner will arbitrate with LTE based on the logical signals and the arbitrators 1020, 1022 on each side. For ease of illustration, in further discussions below the Bluetooth+WLAN modem 1004 is referred to as Bluetooth but is meant to include WLAN or other ISM communications as well.

The two arbitrators 1020, 1022 are coordinated by the host 1014 to make decisions based upon a common policy decided by the host 1014. Based on a host configuration, each arbitrator behaves differently in response to the logical signals sent from the other party. Also based on the host configuration, the logical signals sent from one side to the other may change adaptively based upon the policy settings.

Based on a variety of factors, a host 1014, CxM 640, or other component may determine a coexistence policy to govern the operation of the modems based on the logical lines and other inputs. The host may then communicate the policy to the modems so that they may coordinate their behavior based on the instructions from the host and the logical inputs. Each modem's respective treatment of the logical lines (both input and output) may be different depending on the different policy configurations.

Policy settings may be constructed in a variety of ways to achieve desired performance outcomes. Assuming that Bluetooth is interfering with LTE on both transmission (TX) and receiving (RX) links, example policies to govern the behavior of the arbitrators include: both modems are free running, Bluetooth always wins, LTE always wins, and LTE wins plus Bluetooth bin jumping. Other policies may also be determined. Execution of those policies using the hardware configuration of FIG. 10 are illustrated below.

For the first example policy, in some cases, the host may determine there is no coexistence issue between LTE and Bluetooth and may decide to allow each radio to freely operate. Examples of situations where this policy may be useful include low transmission power, high receive signal power, distance between the radio frequencies being used, and other situations. This policy may be implemented as follows. On the Bluetooth side, Bluetooth may transmit and receive regardless of the setting on the hardware lines from the LTE modem. Bluetooth may not set RX_Priority 1010 and TX_Active 1012. On the LTE side, LTE may transmit and receive regardless of the setting on the hardware lines from Bluetooth. LTE may not set LTE_RX_Active 1008.

The second example policy where Bluetooth always wins (i.e., Bluetooth communications are given priority with LTE opportunistically using the channel when Bluetooth is not) may be the desired policy in certain situations, such as when LTE transports best effort traffic and Bluetooth transports voice traffic. This policy may be implemented as follows. On the Bluetooth side, when Bluetooth has data to send, the Bluetooth transmitter sends regardless of the signal on the LTE_RX_Active line 1008. The TX_Active line 1012 is set active when Bluetooth is transmitting. When Bluetooth is receiving, it asserts priority on the RX_Priority line 1010. On the LTE side, when Bluetooth RX_Priority 1010 is set as priority, LTE stops transmitting. When Bluetooth is not receiving, and RX_Priority 1010 is not set, LTE is permitted to transmit. When TX_Active 1012 is set active, LTE stops receiving. (Alternatively, LTE continues receiving and takes into consideration potential Bluetooth interference. For example, LTE knows the possibility of potential interference from Bluetooth and LTE can change its channel estimation accordingly.) When TX_Active 1012 is not active, LTE can receive. LTE may not set the LTE_RX_Active line 1008 or Bluetooth could ignore the signal, even if set.

The third policy where LTE always wins (i.e., LTE communications are given priority with Bluetooth opportunistically using the channel when LTE does not) may be implemented as follows. On the LTE side, if LTE has anything to transmit, the LTE modem transmits regardless of whether Bluetooth RX_Priority 1010 is set. If the LTE modem is to receive, it keeps receiving regardless of whether TX_Active 1012 is high or low. The LTE modem also sets the LTE_RX_Active line 1008. On the Bluetooth side, when Bluetooth has anything to send, Bluetooth transmits only if the LTE_RX_

Active 1008 is not set, otherwise, the Bluetooth transmitter is off. Bluetooth may continue to receive, allowing Bluetooth receive packets to go through when LTE is not transmitting (or when LTE power level is low). Bluetooth may not set RX_Priority 1010 and TX_Active 1012.

The fourth policy, LTE wins with Bluetooth priority bin jumping may be implemented as follows. On the LTE side, if LTE has anything to transmit, the LTE modem transmits when Bluetooth RX_Priority 1010 is not set. If Bluetooth RX_Priority 1010 is set, LTE stops transmitting. If the LTE modem is to receive anything, it continues receiving regardless of whether TX_Active 1012 is high or low. However, if TX_Active 1012 is high, the LTE modem knows that Bluetooth is transmitting and accounts for the possibility of potential interference from Bluetooth. The LTE modem also sets LTE_RX_Active 1008. On the Bluetooth side, when Bluetooth has anything to send, and if the LTE_RX_Active 1008 is set, Bluetooth transmits for high priority (bin jump) events. Bluetooth also sets the TX_Active line 1012. Bluetooth may know which event is going to take place so that Bluetooth can assign a priority to each event. The priority for specific types of events is configurable (for example, the host may determine which events take priority over others). For example, if Bluetooth has several transmission opportunities to send a particular voice packet before the packet is lost, Bluetooth may not set the RX_Priority line 1010 until immediately before the final transmission opportunity. If the LTE_RX_Active 1008 is set, the Bluetooth transmitter shuts off for low priority Bluetooth events and Bluetooth does not set the TX_Active line 1012. Bluetooth continues receiving and sets the RX_Priority 1010 when a receive event is high priority (bin jump).

In another aspect the host may determine that the radios are to operate in an adaptive/probabilistic manner. During probabilistic operation each radio may set the priority/activity line. For example, Bluetooth may set RX_Priority 1010 only a certain percentage of time. Each radio may also acknowledge the other radio's priority/activity line in a probabilistic manner. For example, Bluetooth may stop transmitting when LTE_RX_Active 1008 is high a certain percentage of time. For example, if the probability is 50%, then Bluetooth would only stop transmitting 50% of the time LTE_RX_Active 1008 is high. The probability may be changed adaptively based on certain targets (such as a target packet error rate (PER), Hybrid Automatic Retransmission request (HARM) termination statistics, desired LTE throughput, etc.)

Other policies may be implemented through time division multiplexing (TDM), where each radio is permitted use of the channel during certain allotted times. The host may control a TDM timeline for different policies. For example, for a certain period the LTE win policy is maintained, for another time period the Bluetooth win policy is maintained, and for another time a probabilistic policy is maintained. As another example, if system conditions change (such as when implementing power backoff), the signals between Bluetooth and LTE may be used differently to adjust overall performance.

In another aspect, coexistence policies may be adapted/reconfigured based on communication conditions experienced by one or more of the radio access technologies and the signals exchanged by the radios to each other. For example, if a certain coexistence policy implemented by one or more of the radios provides certain performance metrics of a radio that the CxM, host, or one of the radios wishes to change, the coexistence system (including the CxM, host, radios, etc.) may dynamically adapt a coexistence policy to improve performance. Another example is as follows: the current policy is LTE wins a+ Bluetooth bin jumping. If the LTE modem notices that the rate of bin jumps is high, the LTE modem starts a power backoff process. Alternatively, this information is passed up to the host and host changes the policy to Bluetooth always wins. This dynamic adaptation of a specific coexistence policy may be in addition to the coexistence system's ability to change between coexistence policies based on communication conditions. Should a coexistence policy be modified, the modifications to the policy may be implemented by a radio without updating the specific policy as managed by a host/CxM, or the policy update may be implemented by a radio and pushed up to the host or CxM. Further, a coexistence policy may be updated by the host and/or CxM and then pushed out to one or more radios over an available host controller interface or other communication line.

Figure 11:
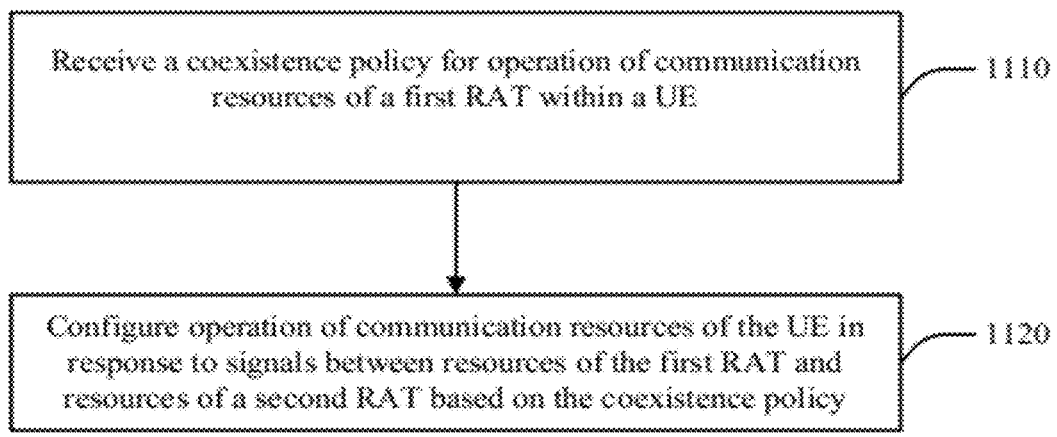
FIG. 11 shows an exemplary process for configuring communication resources according to one aspect of the present disclosure.

As shown in block 1110 of FIG. 11, a coexistence manager may receive over a software messaging input, a coexistence policy for operation of communication resources of a first radio access technology within a user equipment (UE). The coexistence manager also configures operation of communication resources of the UE in response to signals on logical lines between resources of the first radio access technology and resources of a second radio access technology based on the coexistence policy, as shown in block 1120.

A UE may have means for receiving over a software messaging input, a coexistence policy for operation of communication resources of a first radio access technology within a user equipment (UE). The receiving means may be the processor 270 and/or memory 272. The UE also has means for configuring operation of communication resources of the UE in response to signals on logical lines between resources of the first RAT and resources of a second RAT based on the coexistence policy. The configuring means may be the processor 270 and/or memory 272. In another aspect, the aforementioned means may be a module or any apparatus configured to perform the functions recited by the aforementioned means.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communications, the method comprising:
   receiving, by a device comprising a Long Term Evolution (LTE) modem and an industrial, scientific, and medical (ISM) modem, over a software messaging input of the device, a coexistence policy for operation of communication resources of a first radio access technology within a user equipment (UE), in which the coexistence policy:
      describes how the first radio access technology will operate based on contemporaneous operating conditions experienced by a second radio access technology, the contemporaneous operating conditions communicated over logical lines between resources of the second radio access technology and resources of the first radio access technology, in which the first radio access technology is configured to operate in one manner in response to one coexistence policy and configured to operate in a different manner in response to a different coexistence policy, and
      allows the LTE modem to transmit when the ISM modem is not receiving, and the coexistence policy allows the LTE modem to receive when the ISM modem is not transmitting or to receive while accounting for interference from the ISM modem; and
   configuring, by the device, operation of communication resources of the user equipment based at least in part on at least one setting in the coexistence policy governing resource operation in response to signals received on the logical lines, in which the configuring comprises:
      setting a first logical line when the ISM modem is transmitting,
      assigning priority to the ISM modem on a second logical line when the ISM modem is receiving,
      halting transmission by the LTE modem when the ISM modem has priority on the second logical line,
      allowing transmission by the LTE modem when the ISM modem does not have priority on the second logical line, and
      allowing receiving by the LTE modem when the first logical line is not set.

2. The method of claim 1 further comprising
receiving the coexistence policy over a coexistence interface.

3. The method of claim 1 further comprising reconfiguring operation of communication resources based on the coexistence policy in response to communication conditions experienced by the user equipment.

4. The method of claim 1 further comprising reconfiguring operation of communication resources based on the coexistence policy in response to the signals on logical lines between the first radio access technology resources and the second radio access technology resources.

5. The method of claim 1, further comprising reconfiguring operation of communication resources of the user equipment in response to the signals on logical lines between the first radio access technology resources and the second radio access technology resources based on a second coexistence policy, the second coexistence policy controlling operation of communication resources of the first radio access technology.

6. The method of claim 5, in which the coexistence policy allows the industrial, scientific, and medical (ISM) modem to transmit when a Long Term Evolution (LTE) modem is not receiving.

7. The method of claim 6 in which the reconfiguring comprises:
   setting a first logical line when the LTE modem is to receive a signal;
   allowing transmission by the ISM modem when the first logical line is not set; and
   allowing receiving by the ISM modem when the LTE modem is not transmitting or when a power level of the LTE modem is below a threshold value.

8. The method of claim 5, in which the coexistence policy allows the industrial, scientific, and medical (ISM) modem to communicate high priority events or when a Long Term Evolution (LTE) modem is not in operation.

9. The method of claim 8 in which the reconfiguring comprises:
   allowing transmission by the LTE modem when the ISM modem does not have priority on a first logical line;

allowing receiving by the LTE modem while accounting for potential interference from the ISM modem, when a second logical line is set;

setting a third logical line when the LTE modem is to receive an LTE signal; and determining a priority of an ISM signal when the ISM modem desires to transmit the ISM signal, and permitting assertion of the first logical line and setting the second logical line when the priority is above a threshold value.

10. An apparatus for wireless communication, comprising:
a memory; and
at least one processor coupled to the memory executing instructions stored thereon, the at least one processor being configured:
to receive over a software messaging input, a coexistence policy for operation of communication resources of a first radio access technology within a user equipment (UE), in which the coexistence policy:
describes how the first radio access technology will operate based on contemporaneous operating conditions experienced by a second radio access technology, the contemporaneous operating conditions communicated over logical lines between resources of the second radio access technology and resources of the first radio access technology, in which the first radio access technology is configured to operate in one manner in response to one coexistence policy and configured to operate in a different manner in response to a different coexistence policy, and
allows a Long Term Evolution (LTE) modem to transmit when an industrial, scientific, and medical (ISM) modem is not receiving, and the coexistence policy allows the LTE modem to receive when the ISM modem is not transmitting or to receive while accounting for interference from the ISM modem; and
to configure operation of communication resources of the user equipment based at least in part on at least one setting in the coexistence policy governing resource operation in response to signals received on the logical lines, in which the configuring comprises:
setting a first logical line when the ISM modem is transmitting,
assigning priority to the ISM modem on a second logical line when the ISM modem is receiving,
halting transmission by the LTE modem when the ISM modem has priority on the second logical line,
allowing transmission by the LTE modem when the ISM modem does not have priority on the second logical line, and
allowing receiving by the LTE modem when the first logical line is not set.

11. The apparatus of claim 10 in which the processor is further configured to receive the coexistence policy over a coexistence interface.

12. The apparatus of claim 10 in which the processor is further configured to reconfigure operation of communication resources based on the coexistence policy in response to communication conditions experienced by the user equipment.

13. The apparatus of claim 10 in which the processor is further configured to reconfigure operation of communication resources based on the coexistence policy in response to the signals on logical lines between the first radio access technology resources and the second radio access technology resources.

14. The apparatus of claim 10 in which the processor is further configured to reconfigure operation of communication resources of the user equipment in response to the signals on logical lines between the first radio access technology resources and the second radio access technology resources based on a second coexistence policy, the second coexistence policy controlling operation of communication resources of the first radio access technology.

15. The apparatus of claim 10, in which the coexistence policy allows the industrial, scientific, and medical (ISM) modem to transmit when a Long Term Evolution (LTE) modem is not receiving, and in which the processor is further configured:
to set a first logical line when the LTE modem is to receive a signal;
to allow transmission by the ISM modem when the first logical line is not set; and
to allow receiving by the ISM modem when the LTE modem is not transmitting or when a power level of the LTE modem is below a threshold value.

16. The apparatus of claim 10, in which the coexistence policy allows the industrial, scientific, and medical (ISM) modem to communicate high priority events or when a Long Term Evolution (LTE) modem is not in operation, and in which the processor is further configured:
to allow transmission by the LTE modem when the ISM modem does not have priority on a first logical line;
to allow receiving by the LTE modem while accounting for potential interference from the ISM modem, when a second logical line is set;
to set a third logical line when the LTE modem is to receive an LTE signal; and
to determine a priority of an ISM signal when the ISM modem desires to transmit the ISM signal, and permitting assertion of the first logical line and setting the second logical line when the priority is above a threshold value.

17. A computer program product for wireless communication in a wireless network, comprising:
a non-transitory computer-readable medium having non-transitory program code recorded thereon, the program code comprising:
program code to receive over a software messaging input, a coexistence policy for operation of communication resources of a first radio access technology within a user equipment (UE), in which the coexistence policy:
describes how the first radio access technology will operate based on contemporaneous operating conditions experienced by a second radio access technology, the contemporaneous operating conditions communicated over logical lines between resources of the second radio access technology and resources of the first radio access technology, in which the first radio access technology is configured to operate in one manner in response to one coexistence policy and configured to operate in a different manner in response to a different coexistence policy, and
allows a Long Term Evolution (LTE) modem to transmit when an industrial, scientific, and medical (ISM) modem is not receiving, and the coexistence policy allows the LTE modem to receive when the ISM modem is not transmitting or to receive while accounting for interference from the ISM modem; and program code to configure operation of communication resources of the user equipment based at least in part on at least one setting in the coexistence policy governing resource operation in response to signals received on the logical lines, in which the configuring comprises:

setting a first logical line when the ISM modem is transmitting, assigning priority to the ISM modem on a second logical line when the ISM modem is receiving, halting transmission by the LTE modem when the ISM modem has priority on the second logical line, allowing transmission by the LTE modem when the ISM modem does not have priority on the second logical line, and allowing receiving by the LTE modem when the first logical line is not set.

* * * * *